US005381831A

United States Patent [19]

Versland

[11] Patent Number: 5,381,831

[45] Date of Patent: Jan. 17, 1995

[54] DRAIN VALVE

[75] Inventor: Anders Versland, Storekvina, Norway

[73] Assignee: Vico Products Mfg. Co. A/S, Storekvinea, Norway

[21] Appl. No.: 129,158

[22] PCT Filed: Apr. 9, 1992

[86] PCT No.: PCT/NO92/00066

§ 371 Date: Oct. 6, 1993

§ 102(e) Date: Oct. 6, 1993

[87] PCT Pub. No.: WO92/18712

PCT Pub. Date: Oct. 29, 1992

[30] Foreign Application Priority Data

Apr. 9, 1991 [NO] Norway ................................ 911370

[51] Int. Cl.[6] ................................................ F16K 1/00

[52] U.S. Cl. ...................................... 137/868; 4/541.3

[58] Field of Search .................... 137/868; 4/684, 685, 4/689-692, 541.3, 541.5

[56] References Cited

U.S. PATENT DOCUMENTS 2,856,611 10/1958 Velonis .

FOREIGN PATENT DOCUMENTS 0312953 4/1989 European Pat. Off. ............ 4/541.3

*Primary Examiner*—John C. Fox

*Attorney, Agent, or Firm*—Rodman & Rodman

[57] ABSTRACT

A combined valve device (10) for draining of tub (6) and pipe devices consisting of pipes for liquid and air, such as for bubble bath, comprising a housing (5), a first valve (1) for the liquid pipe and a second valve (2) for the air pipe, as well as means for operating and actuating the respective valves. Valve device (10) has one and the same, rigid actuating means, activating or opening and closing valve (1) for the liquid pipe and valve (2) for the air pipe.

14 Claims, 3 Drawing Sheets

DRAIN VALVE

The invention relates to a combined valve device for the draining of vessels and pipe devices consisting of pipes for liquid and air, such as for bubble bath, comprising a housing, a first valve for the liquid pipe and a second valve for the air pipe, as well as means for operating and actuating the respective valves.

In combined pipe devices, i.e., pipes for water and for air, for instance of the type applied in bubble bath, it is essential to be able to drain practically all the water after use. It is almost impossible to prevent water from entering the air pipes in such combined pipe devices when these are in use. This is however not too critical. The essential point is, after use, to have the possibility to completely drain the pipes for water, so that no water is left in any of these. Such water, often waste water, will soon become putrid and create odour in the surrounding area. The water will also represent a potential source of corrosion.

From FR-2557175 there is known a combined valve device for draining vessels and pipe devices, such as those used in bubble bath, comprising a housing, a valve for the liquid pipe and a valve for the air pipe, as well as means for operating and synchronized actuation of the respective valves. By means of two separate wires or lines it is intended that the two valves shall be handled synchronously in relation to each other. However, just a small a mount of slack will prevent sufficient opening of the valves to allow for draining. Furthermore, the pipe is devices and the positioning of the valves are such that complete draining of the air pipe difficult.

According to the invention there is provided a combined valve device of the type mentioned in the introduction, which is characterized by one and the same, rigid actuating means, activating or opening and closing the valve for the pipe for the liquid and the valve for the air pipe.

The first actuating means may advantageously be a lever, rotatably mounted in the housing. The lever may be journaled in one end.

The first valve may advantageously be a conventional closing valve for tubs and basins, which is kept closed by means of its own weight and/or the liquid pressure. The other valve may be a spring-loaded closing valve which is continuously kept in a closed position but which may be opened against the spring pressure.

When not necessary, the lever may be designed and positioned in relation to the respective valves in such a way that the valves open/close simultaneously. This is however not a necessity and the lever may be designed so that one of the valves opens or closes somewhat before the other.

The operating means may consist of a rotatable device which by means of a wire or a line activates the respective valves.

The housing preferably has an opening or fitting designed for connection to an overflow pipe.

The second valve is suitably detachable from the housing by means of a cap which forms the seat for the spring which holds the valve in a closed position.

The valves may advantageously be spaced in relation to each other so that the design height of the valve device is low, i.e., the valves are spaced horizontally at a distance from each other.

Other and additional objects, characteristics and advantages will be evident from the following description of one presently preferred embodiment of the invention, which are given for the purpose of description, without thereby being restrictive, and given in connection with the enclosed drawings wherein.

Figure 1:
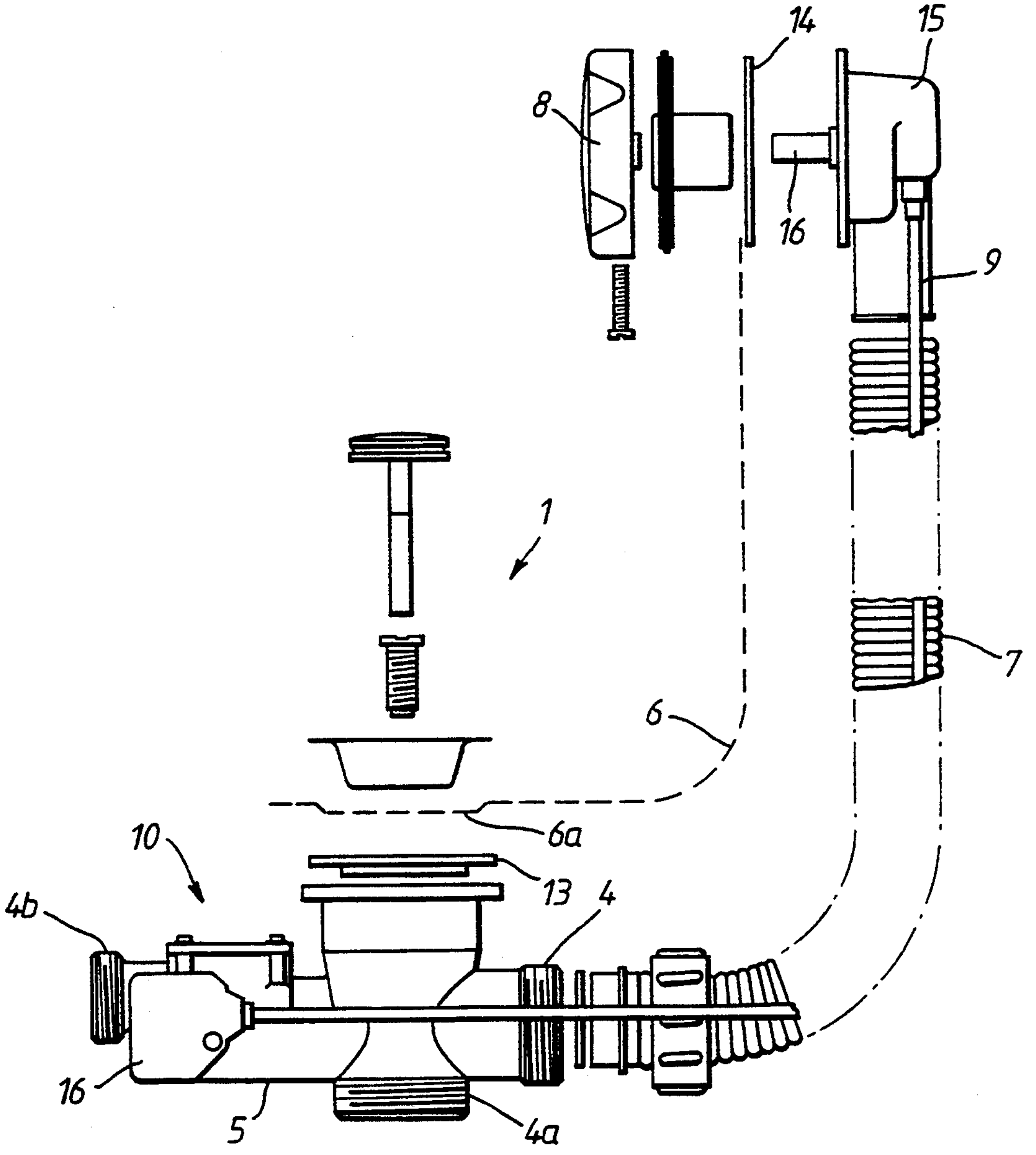
FIG. 1 shows schematically the combined valve device according to the invention, connected to a bathtub and an overflow pipe.

Reference is made to FIG. 1 where the combined valve device 10 is shown in connection with a bathtub 6 and an overflow pipe 7. The combined valve device 10 is mounted under the bathtub's conventional outlet 6*a* and is in close connection with the side of the bathtub by means of gasket 13. The overflow pipe 7 is tightly fastened to the side of the bathtub via gasket 14. Connected to the overflow pipe there is an an operating means in the form of a turning knob 8 fastened to the top part of overflow pipe 15. Inside top part 15 there is arranged a mechanism which is connected to a short spindle 16 to which knob 8 is fastened.

By turning knob 8 and the mechanism inside top part 15, tension, respectively pressure, is exerted on a wire or line 9 running down to valve device 10. Valve device 10 has a connecting tube with threads 4 for connection to overflow pipe 7. Furthermore the housing of valve device 5 has a connecting tube with threads 4*a* for connection to a drainpipe, not shown. The drainpipe preferably has a water seal. Housing 5 has an additional connecting tube with threads 4*b* for connection to an air pipe, not shown. The air pipe is designed for supply of air or gas to nozzles situated at one or more positions in the wall of the bathtub. However, these nozzles and the pipe device are conventional and are not shown. Line 9 enters an actuating chamber 16 so as to activate the respective valves by turning knob 8. Line 9 preferably runs in a sleeve.

Figure 2:
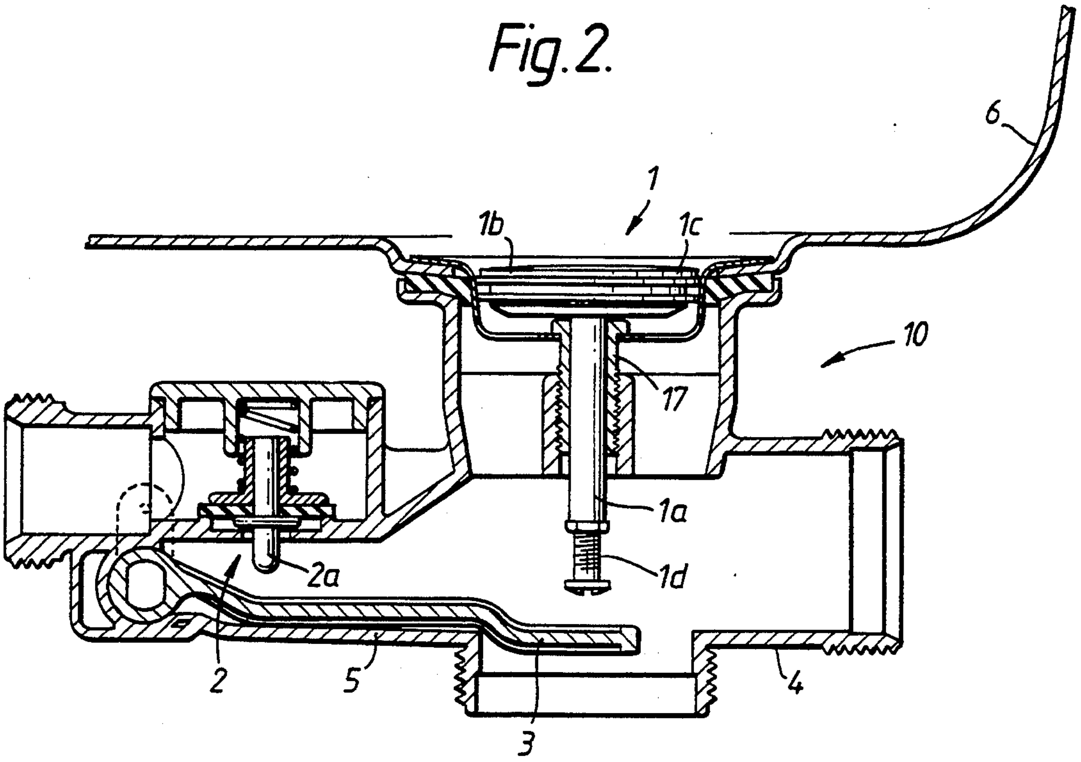
FIG. 2 shows schematically and in cross-section the combined valve device according to FIG. 1.

FIG. 2 shows the combined valve device 10 in more detail. A first valve 1, designed for drainage of water from tub 6 is shown in one embodiment. This consists of a conventional valve stem 1*a*, a valve head 1*b* and an annular seal 1*c*, circumferencially disposed in a groove around valve head 1*b*. Valve stem 1*a* is slidably controlled in a bushing or sleeve 17.

A second valve 2 designed for draining water which has penetrated into an air valve has been positioned in housing 5. In the housing there is positioned an actuating means, in the form of a lever 3. In one end the lever is rotatably journaled in housing 5. With a rotating movement of lever 3, lever 3 contacts the respective valve stems 1*a* and 2*a* which through a further rotating movement lift the annular seals 1*c*, 2*c* from their seats or bases and thereby open valves 1,2. This may happen exactly at the same moment, but lever 3 or valve stems 1*a*, 2*a* may be designed in such a way that one valve will open before the other. As an example there is shown a possibility for lengthwise adjustment of valve stem 1*a* by screwing end piece 1*d* out of or into valve stem 1*a*.

Figure 3:
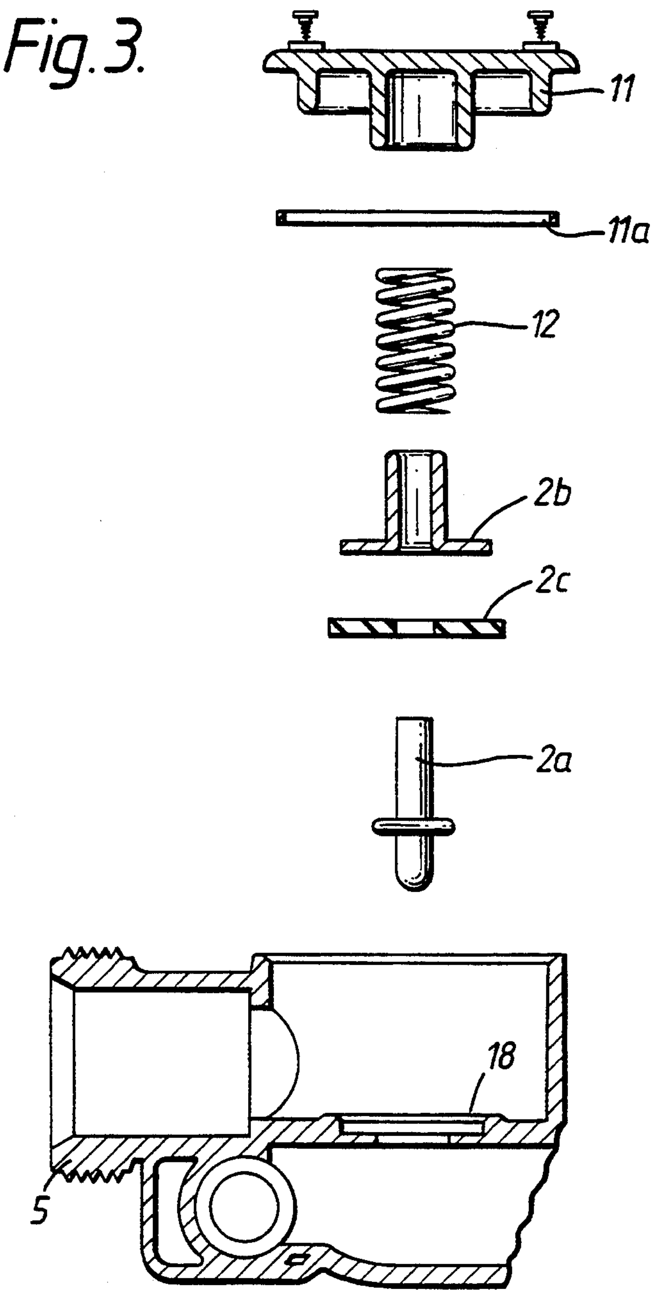
FIG. 3 shows a partial view of the valve device according to FIG. 2 and shows the valve for the air pipe in its separate components.

FIG. 3 shows a part of the valve housing 5 and the individual components in valve 2 separated from each other. Thus valve 2 comprises, as does valve stem 1, a valve stem *2a*, a seal *2c* and a valve head *2b*. It is possible to take valve 2 out of the housing 5 by removing cap 11 which is fastened to housing 5 by means of screws. An annular seal is positioned between cap 11 and housing 5. A spring 12 having its seat in housing 11 presses valve 2 against a valve seat 18 in housing 5.

Figure 4:
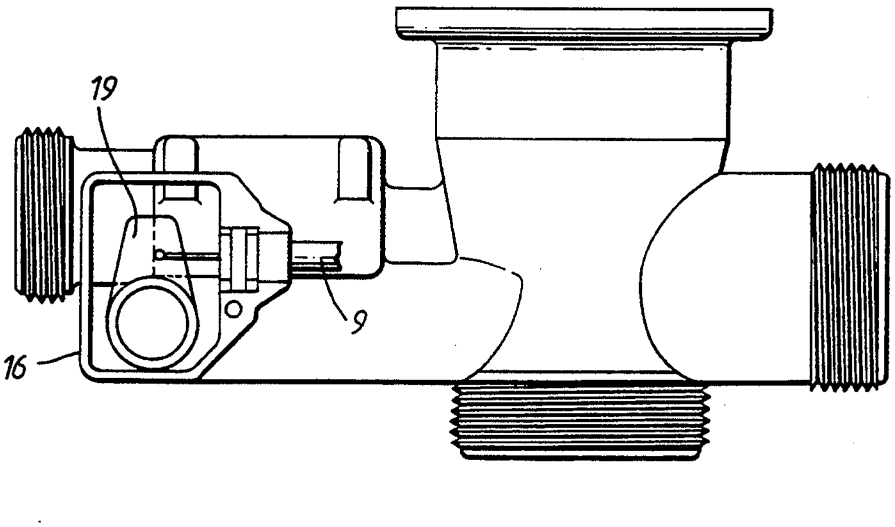
FIG. 4 shows a side view of the valve device where the lead-in housing for the actuating line is shown in cross section.

FIG. 4 shows a top view or side view of housing 5 where the actuating housing 16 is shown in cross section. Lever 19 is shown schematically, and this lever is operated by line 9. Lever 19 is in turn connected to lever 3, so that movement of lever 19 results in a rotating movement of lever 3 and thereby possibility for activating valves 1 and 2. In the illustrated embodiment the valves are shown as being spaced horizontally at a distance from each other. This is strictly speaking unnecessary, and it is possible to space the valves in another manner in relation to each other. However, it is advantageous to place these such as shown in the drawing so that a low building height is obtained with the combined valve device 10. This is advantageous with regard to the distance of the bathtub from the floor and the pipe systems.

I claim:

1. A combined valve device for draining of tubs and pipe systems, consisting of pipes for liquid and air comprising a housing, a first valve for the liquid pipe and a second valve for the air pipe, and means for operating the respective first and second valves including one and the same rigid operating means for opening and closing the first valve for the liquid pipe and for opening and closing the second valve for the air pipe, said second valve being detachable from the housing by means of a cap which forms a seat for a spring.

2. A combined valve device for draining of tubs and pipe systems, consisting of pipes for liquid and air comprising a housing, a first valve for the liquid pipe and a second valve for the air pipe, and means for operating the respective first and second valves including one and the same rigid operating means for opening and closing the first valve for the liquid pipe and for opening and closing the second valve for the air pipe, said first and second valves being spaced side by side from each other such that movement of one said valve does not influence movement of the other said valve.

3. A valve device according to claim 2, characterized in that the actuating means is a lever (5) rotatably mounted in the housing (5).

4. A valve device according to claim 3, characterized in that said lever is journaled in one end.

5. A valve device according to claim 2, characterized in that the first valve is a conventional closing valve for tubs and basins which is kept closed by means of its own weight.

6. A valve device according to claim 2, characterized in that the second valve is a spring-loaded closing valve which is continuously kept in a closed position, but which may be opened against the spring pressure.

7. A valve device according to claim 2, characterized in that one valve opens/closes simultaneously with the other valve.

8. A valve device according to claim 2, characterized in that the operating means consist of a rotatable device which by means of a a line member actuates the respective valves.

9. A valve device according to claim 2, characterized in that the housing includes fitting means for connection to an overflow pipe.

10. A valve device according to claim 2 characterized in that the first valve is a conventional closing valve for tubs and basins which is kept closed by means of a liquid pressure.

11. A combined valve device for draining tubs and pipe systems, including respective pipes for liquid and air comprising a housing, a first valve for liquid drainage in communication with the liquid pipe and a second valve for airflow in communication with the air pipe, said first and second valves each having open and closed positions and a valve stem, said first and second valves being spaced side by side from each other such that said valve stems are spaced from each other, and a pivotal arm member pivoted to said housing and movable into and out of engagement with the valve stems of said first and second valves such that movement of said pivotal arm member into engagement with said valve stems enables said valves to move to one of said open and closed positions and movement of said arm member away from said valve stems enables said valves to move to the other of said open and closed positions.

12. The device as claimed in claim 11 wherein said arm member is normally positioned away from said valve stems.

13. The device as claimed in claim 12 including an elongated line member joined to said arm member for controlling movement of said arm member into and out of engagement with said valve stems.

14. The device as claimed in claim 11 wherein said arm member includes first and second valve stem engagement portions offset from each other such that one of said valve stem engagement portions can engage one of said valve stems while the other said valve stem engagement portion is spaced from the other said valve stem during a predetermined movement of said arm member.

* * * * *